(12) United States Patent
Erta et al.

(10) Patent No.: US 12,532,256 B2
(45) Date of Patent: Jan. 20, 2026

(54) AP GROUPING FOR FAST MOVING ROAMING ALONG A PATHWAY

(71) Applicant: Cisco Technology, Inc., San Jose, CA (US)

(72) Inventors: Alessandro Erta, Licciana Nardi (IT); Luca Bisti, Grosseto (IT); Gaetano Catalli, Florence (IT); Carmine Benedetto, Pisa (IT)

(73) Assignee: Cisco Technology, Inc., San Jose, CA (US)

( * ) Notice: Subject to any disclaimer, the term of this patent is extended or adjusted under 35 U.S.C. 154(b) by 676 days.

(21) Appl. No.: 17/749,508

(22) Filed: May 20, 2022

(65) Prior Publication Data
US 2023/0379814 A1    Nov. 23, 2023

(51) Int. Cl.
*H04W 48/20* (2009.01)
*H04B 17/318* (2015.01)
*H04W 8/12* (2009.01)
*H04W 40/32* (2009.01)

(52) U.S. Cl.
CPC .......... *H04W 48/20* (2013.01); *H04B 17/318* (2015.01); *H04W 8/12* (2013.01); *H04W 40/32* (2013.01)

(58) Field of Classification Search
CPC ....... H04W 48/20; H04W 8/12; H04W 40/32; H04B 17/318
See application file for complete search history.

(56) References Cited

U.S. PATENT DOCUMENTS

| | | | |
|---|---|---|---|
| 10,383,005 B2 | 8/2019 | Lee et al. | |
| 10,687,257 B2 | 6/2020 | Condeixa et al. | |
| 10,694,452 B2 | 6/2020 | Patwardhan et al. | |
| 10,749,746 B2 | 8/2020 | Thubert et al. | |
| 10,827,404 B2 | 11/2020 | Gupta et al. | |
| 12,069,483 B2 * | 8/2024 | Tong | H04W 16/10 |
| 2018/0376399 A1 * | 12/2018 | Zhou | H04W 12/06 |
| 2019/0342167 A1 | 11/2019 | Thubert et al. | |

(Continued)

OTHER PUBLICATIONS

Tao Lei et al, "Handoff management scheme based on frame loss rate and RSSI prediction for IEEE 802.11 networks", 2016 International Symposium On Wireless Communication Systems (ISWCS), IEEE,Sep. 20, 2016 (Sep. 20, 2016) (Year: 2016).*

(Continued)

*Primary Examiner* — Charles C Jiang
*Assistant Examiner* — Margaret Marie Anderson
(74) *Attorney, Agent, or Firm* — Lee & Hayes, P.C.

(57) ABSTRACT

In one embodiment, a mobile system receives a group identifier for wireless access points associated with a pathway via which the mobile system is to travel. The mobile system receives, during travel of the mobile system along the pathway, beacons from a plurality of wireless access points. Each of the plurality of wireless access points indicates its group identifier in its beacon. The mobile system selects, based on the beacons, a particular access point from among the plurality of wireless access points for roaming, in part by giving preference to any access points in the plurality of wireless access points having a group identifier that matches the group identifier associated with the pathway. The mobile system wirelessly roams to the particular access point.

20 Claims, 7 Drawing Sheets

(56) References Cited

U.S. PATENT DOCUMENTS

2020/0084712 A1* 3/2020 Wu .................. H04W 48/20
2023/0105571 A1* 4/2023 Mohamed Kasim ........................
H04B 17/318
370/329

OTHER PUBLICATIONS

Andrew Zignani, "The Future of Automotive Connectivity" ABI Research, Jul. 2021, IEEE Denver, World Economic Forum (Year: 2021).*
"BSS Colouring or Spatial Reuse (802.11AX AKA WIFI6)", online: https://www.wifi-professionals.com/2019/07/bss-colouring-or-spatial-reuse-802-11ax-aka-wifi6, Jul. 4, 2019, accessed Apr. 28, 2022, 10 pages.

* cited by examiner

AP GROUPING FOR FAST MOVING ROAMING ALONG A PATHWAY

TECHNICAL FIELD

The present disclosure relates generally to computer networks, and, more particularly, to access point (AP) grouping for fast moving roaming along a pathway.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). However, cellular technologies are typically not practical for certain scenarios involving fast moving nodes, such as trains. Thus, backhauling in these types of deployments typically rely on using Wi-Fi between mobile nodes and access points (APs) distributed along the path of travel.

The dynamic nature of wireless networks involving fast moving nodes, as well as the environmental radio frequency (RF) conditions, can lead to packet loss. In addition, roaming under the various Wi-Fi standards is often too slow for seamless roaming in these cases. In other words, some message exchanges in fast moving situations may take too long to occur before the previous link breaks, due to the movement of the mobile node.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a mobile system receives a group identifier for wireless access points associated with a pathway via which the mobile system is to travel. The mobile system receives, during travel of the mobile system along the pathway, beacons from a plurality of wireless access points. Each of the plurality of wireless access points indicates its group identifier in its beacon. The mobile system selects, based on the beacons, a particular access point from among the plurality of wireless access points for roaming, in part by giving preference to any access points in the plurality of wireless access points having a group identifier that matches the group identifier associated with the pathway. The mobile system wirelessly roams to the particular access point.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
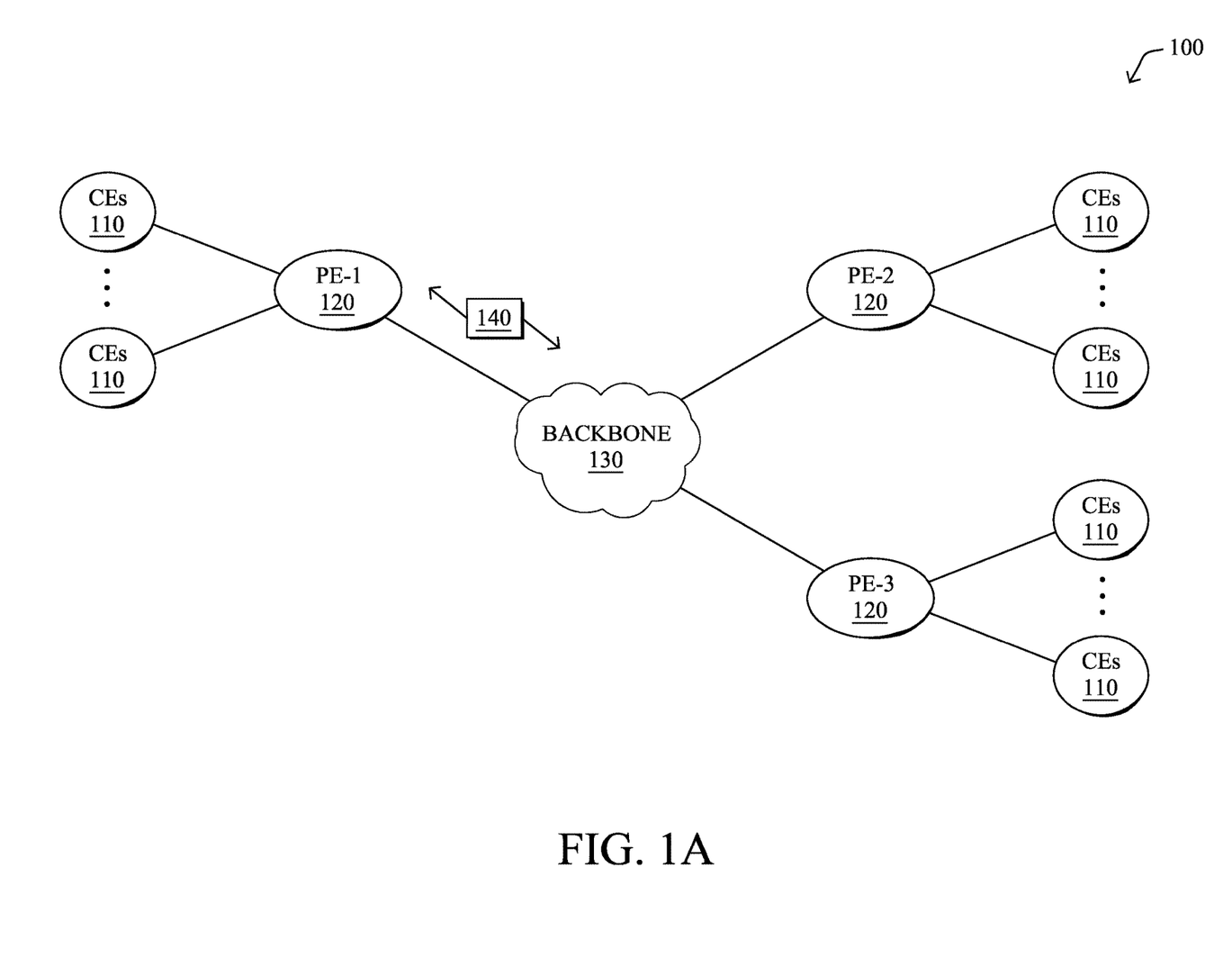
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
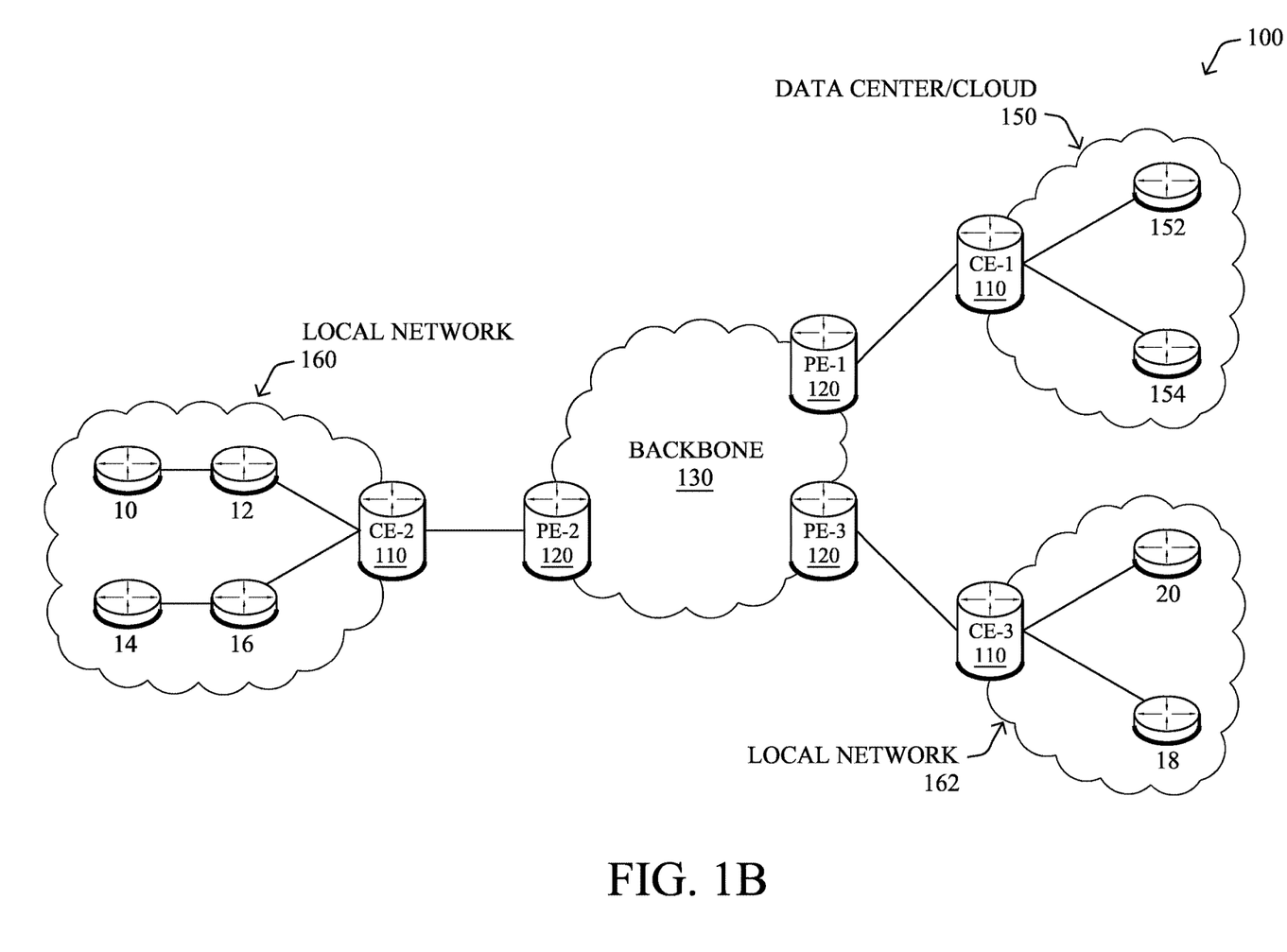

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
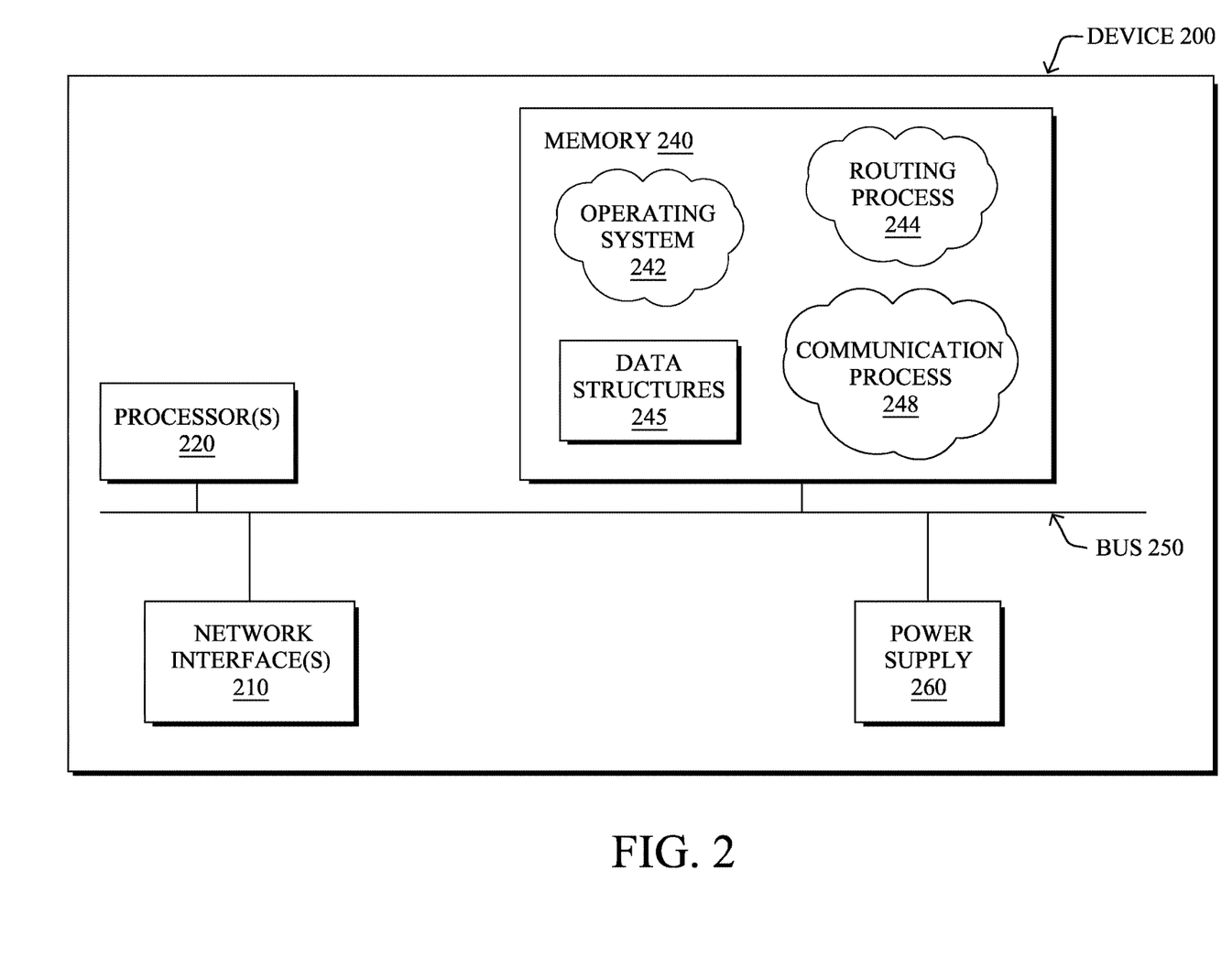
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

Figure 3:
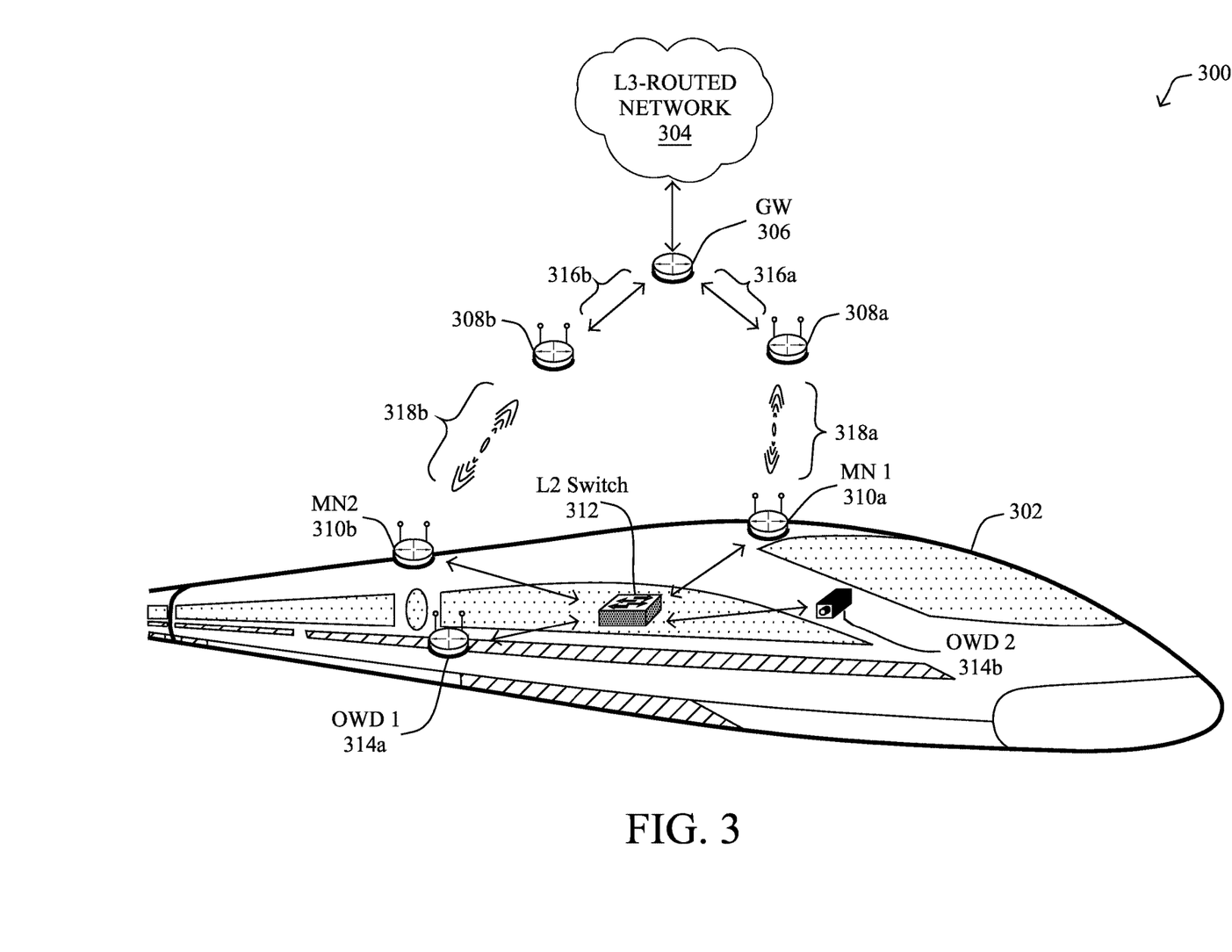
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes (MNs) 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless base stations/access points (APs) 308. For instance, as shown, there may be trackside APs 308a-308b shown. Note that while these wireless access points are referred to herein as 'trackside,' their locations can be varied depending on the deployment scenario (e.g., roadside, etc.).

During operation, APs 308a-308b may form wireless connections with MN 310a and/or MN 310b, to provide wireless connectivity to mobile system 302 as it travels. To this end, each AP 308 may include at least 1.) a wireless interface to communicate with a MN 310 and 2.) an interface to communicate with a gateway, denoted "GW" 306 in the Figures for simplicity. Typically, the connections between APs 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with APs 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with AP 308a. Such a connection may be formed using a suitable transmission protocol, such as the Prodigy protocol by Fluidmesh (now Cisco Systems) or another wireless protocol that supports extremely fast handoffs. Consequently, MN 310a may establish a first tunnel over wireless connection 318a. GW 306 and AP 308a may form a second tunnel via their connection 316a, likewise. Thus, when AP 308a sends traffic that it receives from MN 310a towards GW 306, it may encapsulate the traffic and tunneled via the first tunnel, which AP 308a then encapsulates for transport via the second tunnel to GW 306. A similar approach may be taken with respect to wireless connection 318b between MN 310b and AP 308b, as well as connection 316b between AP 308b and GW 306.

In alternative embodiments, a single L2 tunnel may be established between each AP 308 and GW 306. This tunnel will carry L2 traffic between GW 306 and the MN 310 to which the AP 308 is connected. For instance, a first L2 tunnel may be formed between GW 306 and AP 308a over which traffic conveyed between AP 308a and MN 310a may be transported, assuming that wireless connection 318a exists. Similarly, another GW 306 and AP 308b may form a second L2 tunnel over which traffic conveyed between AP 308b and MN 310b may be transported, assuming that wireless connection 318a exists.

Typically, only a single wireless link is active at any given time between a mobile system, such as mobile system 302, and any given AP 308. For instance, assume that MN 310a is wirelessly connected to AP 308a. In such a case, any other MN 310 on mobile system 302 (e.g., MN 310b, etc.) may be in an idle state at that time. In other words, one of the mobile nodes (e.g., MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, mobile wireless backhauling is challenging, particularly in cases of fast-moving mobile systems, such as trains, busses, mine carts, trucks, cranes, and the like. These vehicles have to provide connectivity to onboard wired and/or wireless devices without any interruptions. Cellular technologies, such as Long—Term Evolution (LTE), are typically not practical for such scenarios, so backhauling is performed by Wi-Fi between mobile nodes (e.g., on a train) and distributed nodes along the path (e.g., trackside nodes along the rails). However, the dynamic nature of the network, as well the environmental radio frequency (RF) conditions, may lead to packet losses. In addition, roaming under the various Wi-Fi standards is often too slow for seamless roaming in these cases. 1n other words, some message exchanges in fast-moving situations may take too long to occur before the previous link breaks due to the movement of the mobile node. 1n addition, a fast moving mobile system may need to distinguish between APs along different pathways for purposes of making handoff/roaming decisions.

——AP Grouping for Fast Moving Roaming Along a Pathway——

The techniques herein introduce an AP grouping mechanism that can be used to improve wireless handoffs/roaming, particularly in scenarios where the paths are known in advance, such as in the case of railways, roadways, and the like. In some aspects, APs along the path of travel of the mobile system can be grouped. In turn, the APs may signal their group identifier to the mobile system as it travels, thereby allowing the mobile system to give preference to those APs along its path of travel, when making roaming decisions.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in some embodiments, a mobile system receives a group identifier for wireless access points associated with a pathway via which the mobile system is to travel. The mobile system receives, during travel of the mobile system along the pathway, beacons from a plurality of wireless access points. Each of the plurality of wireless access points indicates its group identifier in its beacon. The mobile system selects, based on the beacons, a particular access point from among the plurality of wireless access points for roaming, in part by giving preference to any access points in the plurality of wireless access points having a group identifier that matches the group identifier associated with the pathway. The mobile system wirelessly roams to the particular access point.

Figure 4A:
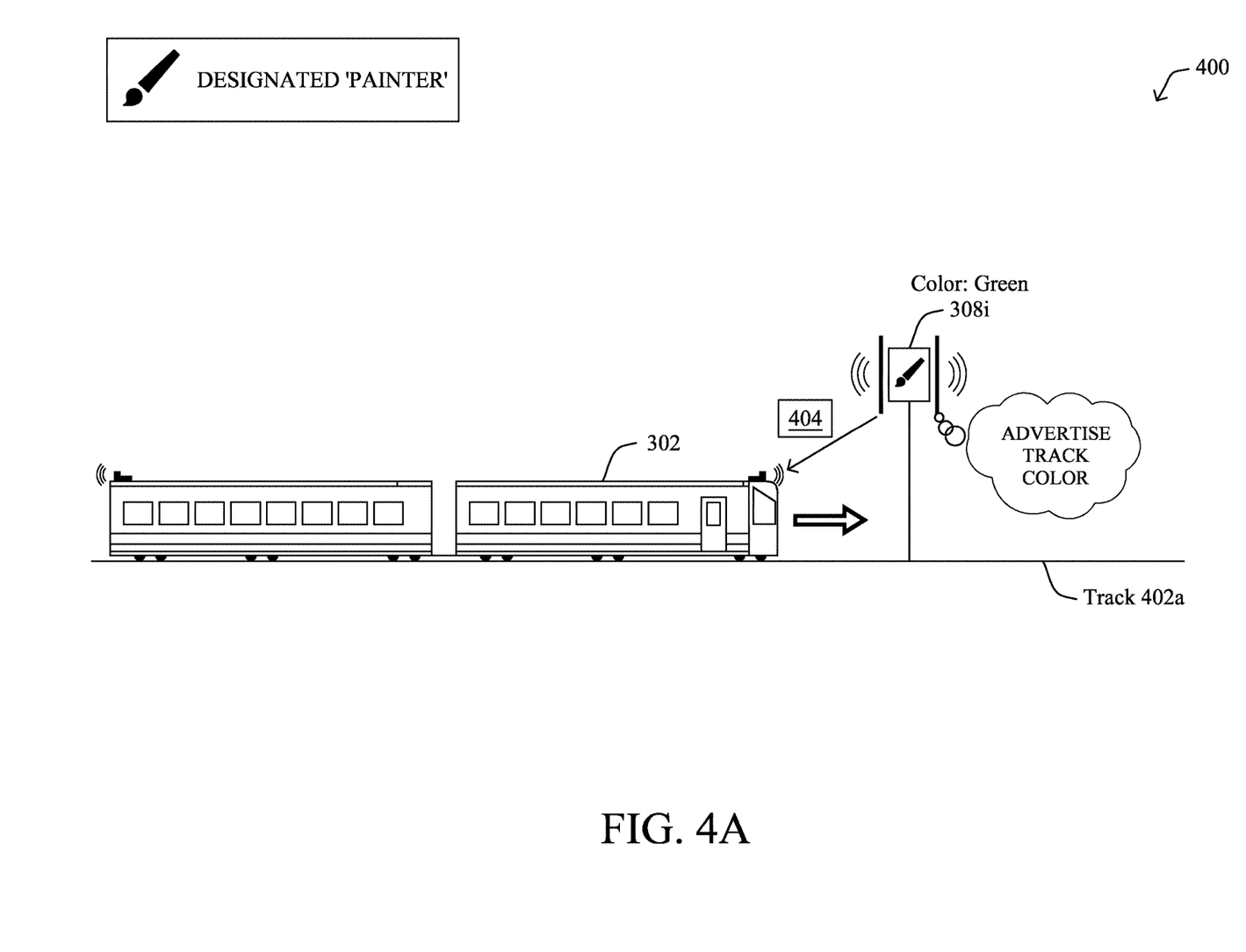
FIGS. 4A-4B illustrate examples of using access point (AP) grouping for fast moving node roaming along a pathway.
Figure 4B:
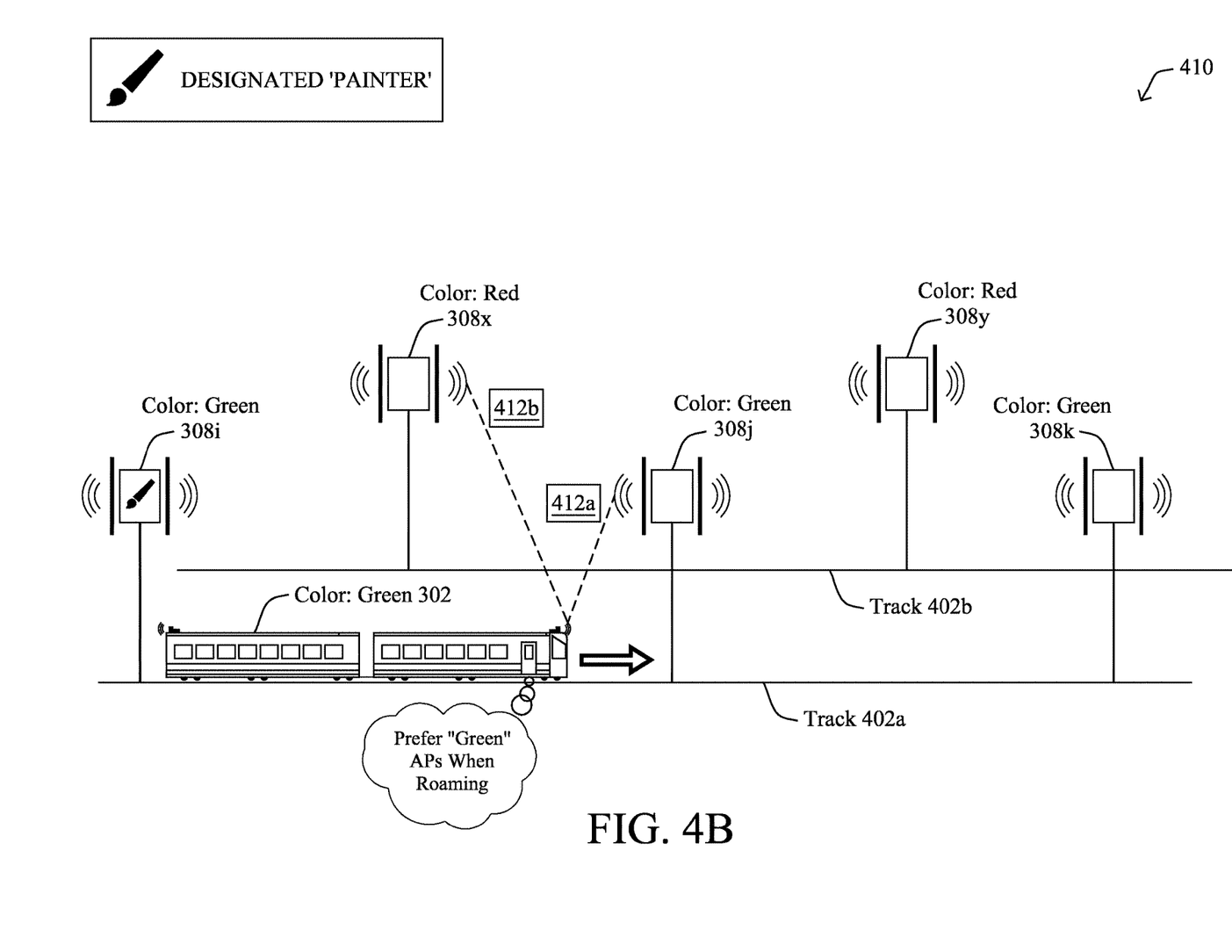

Operationally, FIGS. 4A-4B illustrate examples of using access point (AP) grouping for fast moving node roaming along a pathway, according to various embodiments. In various embodiments, the techniques herein propose that each AP in the deployment is configured with one or more group identifiers. For illustrative purposes, these group identifiers are described herein as different 'colors.' However, as would be appreciated, any form of data may be used to distinguish between the different AP groups, such as numerals, letters, symbols, combinations thereof, or the like, as well.

In various embodiments, at least one of the APs along a path may be designated as a 'painter' that is able to assign an AP group identifier to the APs along the path and/or notify a mobile node as to that identifier. Typically, the designated painter AP will be located closest to an end of the path, which could also be a sub-path of a larger path, such as its start. In addition, in some embodiments, each path may only have a single, exclusive painter AP designated.

By way of example, assume that mobile system 302 is traveling, or is able to travel, along a particular pathway, track 402a. Initially, mobile system 302 may not have any AP grouping assigned to it for use and, thus, treat all APs that encounters, equally, for purposes of making its roaming decisions (e.g., based on their signal strengths, etc.). Once it encounters AP 308i, which has been designated the 'painter' for track 402a, mobile system 302 may receive a specialized beacon 404 from AP 308i that includes an indication of the group identifier for the APs associated with track 402a for use as it travels along track 402a. For instance, AP 308i may advertise to mobile system 302 that the APs along track 402*a* are painted 'green,' meaning that mobile system 302 should prefer roaming to green APs during its travels. In other words, AP 308*i* may 'paint' mobile system 302 green, to match the color of the APs along track 402*a*.

In various embodiments, the designation of a 'painter' AP may be made by a supervisory service for the network or by a network administrator. For instance, a network administrator may specifically configure AP 308*i* to paint mobile systems traversing track 402*a* with the color of the APs along track 402*a*. Similarly, the color/AP group identifier may be pushed to each of the APs along the path by the supervisory service or painter AP, so that each AP knows its AP grouping(s).

In some instances, AP 308*i* may only have a single color/AP group identifier associated with it. However, other APs along the path may have multiple colors/AP group identifiers, in some embodiments. In addition, the color/group specified to mobile system 302 by painter AP 308*i* may also be applicable to the entire set of nodes/radios of mobile system 302, as a whole, in some embodiments. In other words, even in cases in which mobile system 302 includes multiple nodes/radios, they may universally be set to the color 'green,' as in the example shown.

FIG. 4B illustrates an example 410 of the roaming decisions made by mobile is system 302 as it travels along its pathway, track 402*a*. To further illustrate the operation of the techniques herein, assume that there are two tracks that run substantially parallel to one another, track 402*a* and track 402*b*. During use, mobile system 302 may travel in one direction along track 402*a* and in the opposite direction along track 402*b*. Here, APs 308*i*-308*k* may be associated with track 402*a*, such as being located alongside it, whereas APs 308*x*-308*y* may be associated with track 402*b*, instead. Accordingly, APs 308*x*-308*y* may have a different group identifier assigned to them (e.g., the color 'red') than that of APs 308*i*-308*k* (e.g., the color 'green').

In various embodiments, the APs shown may include their respective AP group identifiers in beacons that they send. Thus, as mobile system 302 travels along track 402*a*, it may receive beacons from any nearby AP 308, potentially including from APs that are associated with other pathways, such as APs 308*x*-308*y* located along track 402*b*. For instance, as shown, assume that mobile system 302 receives beacon 412*a* from AP 308*j* that includes its group identifier (e.g., the color 'green') and beacon 412*b* from AP 308*x* that includes its group identifier (e.g., the color 'red').

According to various embodiments, mobile system 302 may be configured by the painter AP 308*i* along track 402*a* to give preference to APs 308 painted 'green,' when making roaming decisions. In other words, whether an AP 308 has a group identifier that matches that indicated by painter AP 308*i* to mobile system 302 may be a factor in the wireless roaming decision by mobile system 302.

For instance, assume in FIG. 4B that mobile system 302 is currently attached to AP 308*i*, but receives beacons 412*a*-412*b* as it travels along track 402*a*. In such a case, mobile system 302 may opt to wirelessly roam from AP 308*i* to AP 308*j*, instead of to AP 308*x*, based in part on the fact that AP 308*j* is colored 'green,' the color for the APs along track 402*a*. In turn, mobile system 302 may then roam to the selected AP 308*j*.

It is important to note that the color/AP group preference may also operate in conjunction with traditional approaches for handoff/roaming decisions, as well. For instance, in many cases, mobile system 302 may still also consider the signal characteristics of the received beacons 412, such as their received signal strength is indicators (RSSIs), when making its roaming decisions. To this end, in some embodiments, mobile system 302 may impose an initial condition that any roaming candidates must have a beacon whose RSSI exceeds a predefined threshold. If this condition is not met, mobile system 302 may exclude that AP from further consideration, even if the AP advertises a group identifier that matches that of track 402*a*. Thus, if the RSSI of beacon 412*a* is too low, mobile system 302 may still opt to roam to AP 308*x*, even though its color/group identifier is not the preferred one.

However, when faced with multiple potential roaming candidates (i.e., APs 308 to which mobile system 302 may roam), the roaming algorithm of mobile system 302 may apply additional weight to any AP 308 whose group identifier matches what was advertised to mobile system 302 by painter AP 308*i*. This can be particularly useful in cases in which the physical locations of APs 308 are such that an AP 308 along a different track (e.g., AP 308*x*) would otherwise appear to be the 'best' roaming candidate for mobile system 302 at any given time or location. Even if true, it may very well be the case that this scenario is very transitory in nature and that an AP 308 along the current track 402*a* is soon again the 'best' AP for mobile system 302. Without such a preference mechanism, this could entail mobile system 302 performing two handoff/roaming operations, instead of one, thereby reducing performance.

Figure 5:
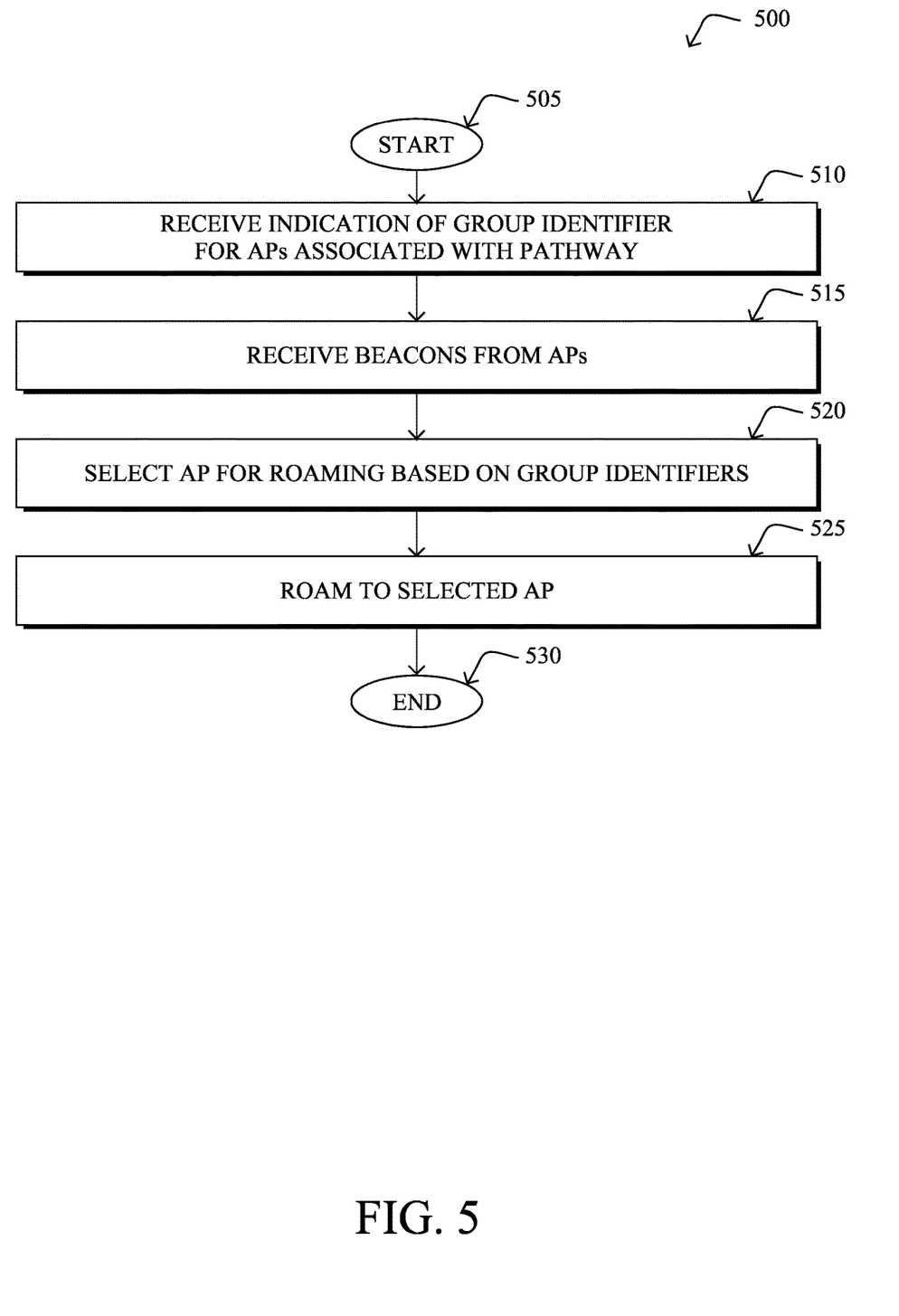
FIG. 5 illustrates an example simplified procedure for using AP grouping for fast moving node roaming along a pathway.

FIG. 5 illustrates an example simplified procedure (e.g., a method) for using AP grouping for fast moving node roaming along a pathway, according to various embodiments. For example, one or more non-generic, specifically configured devices/apparatuses (e.g., devices 200) on board a mobile system may perform procedure 500 by executing stored instructions (e.g., communication process 248 and/or routing process 244). Procedure 500 may start at step 505 and continues on to step 510 where, as described in greater detail above, the mobile system may receive a group identifier for wireless access points associated with a pathway via which the mobile system is to travel. In various embodiments, the mobile system receives the group identifier from a designated access point among the wireless access points associated with the pathway. In one embodiment, the designated access point has only a single group identifier assigned is to it. In another embodiment, the designated access point is exclusively able, from among the wireless access points associated with the pathway, to cause the mobile system to prefer roaming to access points having the group identifier. In yet another embodiment, the designated access point is located closest to an end of the pathway from among the plurality of wireless access points associated with the pathway. In some embodiments, the pathway comprises a railroad track or a roadway. In another embodiment, the mobile system comprises a moving vehicle.

At step 515, as detailed above, the mobile system may receive, during travel of the mobile system along the pathway, beacons from a plurality of wireless access points. In various embodiments, each of the plurality of wireless access points indicating its group identifier in its beacon. In some embodiments, at least one access point in the plurality of wireless access points whose group identifier does not match that of the group identifier is located along a different pathway than the pathway via which the mobile system is to travel.

At step 520, the mobile system may select, based on the beacons, a particular access point from among the plurality of wireless access points for roaming, as described in greater detail above. In various embodiments, this may be done in part by giving preference to any access points in the plurality of wireless access points having a group identifier that matches the group identifier associated with the pathway. In some embodiments, the particular access point has a group identifier that matches the group identifier associated with the pathway. In one embodiment, the mobile system may make the selection by determining that an access point in the plurality of wireless access points having a group identifier that matches the group identifier associated with the pathway is not a roaming candidate, based in part on its beacon having a received signal strength indicator (RSSI) being below a threshold.

At step 525, as detailed above, the mobile system may wirelessly roam to the particular access point. Procedure 500 then ends at step 530.

It should be noted that while certain steps within procedure 500 may be optional is as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for grouping access points along a pathway to facilitate wireless roaming by a mobile node/system, it is to be understood that various other adaptations and modifications may be made within the spirit and scope of the embodiments herein. For example, while certain embodiments are described herein with respect to using certain wired and/or wireless protocols, other suitable protocols may be used, accordingly. In addition, while certain types of mobile systems are described herein, the techniques herein are not limited as such and could be applied to any form of moving node, client, or system.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, at a mobile system, a group identifier for wireless access points associated with a pathway via which the mobile system is to travel, wherein the pathway is a physical pathway and the group identifier is used to differentiate wireless access points along the pathway from other access points not along the pathway;
   receiving, at the mobile system and during travel of the mobile system along the pathway, beacons from a plurality of wireless access points, each of the plurality of wireless access points indicating its group identifier in its beacon;
   selecting, by the mobile system and based on the beacons, a particular access point from among the plurality of wireless access points for roaming, in part by excluding from consideration any of the other access points whose group identifier does not match the group identifier associated with the pathway, unless none of the plurality of wireless access points that do have the group identifier associated pathway with the pathway are suitable for roaming; and
   wirelessly roaming, by the mobile system, to the particular access point.

2. The method as in claim 1, wherein the particular access point has a group identifier that matches the group identifier associated with the pathway.

3. The method as in claim 1, wherein selecting the particular access point from among the plurality of wireless access points comprises:
   determining, by the mobile system, that an access point in the plurality of wireless access points having a group identifier that matches the group identifier associated with the pathway is not a roaming candidate, based in part on its beacon having a received signal strength indicator (RSSI) being below a threshold.

4. The method as in claim 1, wherein the mobile system receives the group identifier from a designated access point among the wireless access points associated with the pathway.

5. The method as in claim 4, wherein the designated access point has only a single group identifier assigned to it.

6. The method as in claim 4, wherein the designated access point is exclusively able, from among the wireless access points associated with the pathway, to cause the mobile system to prefer roaming to access points having the group identifier.

7. The method as in claim 4, wherein the designated access point is located closest to an end of the pathway from among the plurality of wireless access points associated with the pathway.

8. The method as in claim 1, wherein at least one access point in the plurality of wireless access points whose group identifier does not match that of the group identifier is located along a different pathway than the pathway via which the mobile system is to travel.

9. The method as in claim 1, wherein the pathway comprises a railroad track or a roadway.

10. The method as in claim 1, wherein the mobile system comprises a moving vehicle.

11. An apparatus of a mobile system, comprising:
    one or more network interfaces;
    a processor coupled to the one or more network interfaces and configured to execute one or more processes; and
    a memory configured to store a process that is executable by the processor, the process when executed configured to:
       receive a group identifier for wireless access points associated with a pathway via which the apparatus is to travel, wherein the pathway is a physical pathway and the group identifier is used to differentiate wireless access points along the pathway from other access points not along the pathway;
       receive, during travel of the apparatus along the pathway, beacons from a plurality of wireless access points, each of the plurality of wireless access points indicating its group identifier in its beacon;
       select, based on the beacons, a particular access point from among the plurality of wireless access points for roaming, in part by excluding from consideration any of the other access points whose group identifier does not match the group identifier associated with the pathway, unless none of the plurality of wireless access points that do have the group identifier associated with pathway are suitable for roaming; and wirelessly roam to the particular access point.

12. The apparatus as in claim 11, wherein the particular access point has a group identifier that matches the group identifier associated with the pathway.

13. The apparatus as in claim 11, wherein the apparatus selects the particular access point from among the plurality of wireless access points by:

determining that an access point in the plurality of wireless access points having a group identifier that matches the group identifier associated with the pathway is not a roaming candidate, based in part on its beacon having a received signal strength indicator (RSSI) being below a threshold.

14. The apparatus as in claim 11, wherein the apparatus receives the group identifier from a designated access point among the wireless access points associated with the pathway.

15. The apparatus as in claim 14, wherein the designated access point has only a single group identifier assigned to it.

16. The apparatus as in claim 14, wherein the designated access point is exclusively able, from among the wireless access points associated with the pathway, to cause the apparatus to prefer roaming to access points having the group identifier.

17. The apparatus as in claim 14, wherein the designated access point is located closest to an end of the pathway from among the plurality of wireless access points associated with the pathway.

18. The apparatus as in claim 11, wherein at least one access point in the plurality of wireless access points whose group identifier does not match that of the group identifier is located along a different pathway than the pathway via which the apparatus is to travel.

19. The apparatus as in claim 11, wherein the pathway comprises a railroad track or a roadway.

20. A tangible, non-transitory, computer-readable medium storing program instructions that cause a mobile system to execute a process comprising:

receiving, at the mobile system, a group identifier for wireless access points associated with a pathway via which the mobile system is to travel, wherein the pathway is a physical pathway and the group identifier is used to differentiate wireless access points along the pathway from other access points not along the pathway;

receiving, at the mobile system and during travel of the mobile system along the pathway, beacons from a plurality of wireless access points, each of the plurality of wireless access points indicating its group identifier in its beacon;

selecting, by the mobile system and based on the beacons, a particular access point from among the plurality of wireless access points for roaming, in part by excluding from consideration any of the other access points whose group identifier does not match the group identifier associated with the pathway, unless none of the plurality of wireless access points that do have the group identifier associated with the pathway are suitable for roaming; and wirelessly roaming, by the mobile system, to the particular access point.

* * * * *